United States Patent [19]
Bradley et al.

[11] Patent Number: 5,396,572
[45] Date of Patent: Mar. 7, 1995

[54] OPTICAL FIBER CONNECTOR HAVING A UNIPARTITE CAP

[75] Inventors: Kelvin B. Bradley; Norman R. Lampert, both of Norcross, Ga.

[73] Assignee: AT&T Corp., Murray Hill, N.J.

[21] Appl. No.: 105,202

[22] Filed: Aug. 10, 1993

[51] Int. Cl.⁶ ............................................. G02B 6/36
[52] U.S. Cl. .................................. 385/78; 385/60; 385/69; 385/87
[58] Field of Search .................. 385/60, 69, 78, 86, 385/87

[56] References Cited

U.S. PATENT DOCUMENTS

| | | | |
|---|---|---|---|
| 4,579,418 | 4/1986 | Parchet et al. | 385/60 |
| 4,812,009 | 3/1989 | Carlisle et al. | 385/62 |
| 4,934,785 | 6/1990 | Mathis et al. | 385/68 |
| 5,082,345 | 1/1992 | Cammons et al. | 385/60 |
| 5,096,276 | 3/1992 | Gerace et al. | 385/76 |
| 5,101,463 | 3/1992 | Cubukciyan et al. | 385/72 |
| 5,129,023 | 7/1992 | Anderson et al. | 385/70 |
| 5,142,601 | 8/1992 | Shibata et al. | 385/86 |
| 5,261,019 | 11/1993 | Beard et al. | 385/60 |
| 5,285,510 | 2/1994 | Slaney | 385/78 |

*Primary Examiner*—Frank Gonzalez
*Attorney, Agent, or Firm*—Michael A. Morra

[57] ABSTRACT

A connector for terminating a cable comprising a buffered optical fiber surrounded by filamentary strength members and an outer jacket comprises a spring-loaded ferrule/barrel assembly, a unipartite cap and a crimping sleeve. The unipartite cap comprises a one-piece structure having a connector end that mates with a twist-and-lock coupling apparatus, and is adapted to cooperate with the crimping sleeve to capture filamentary strength members contained within the cable at a cable-entrance end. The crimping sleeve has a first cylindrical portion which surrounds the cable-entrance end of the cap, and a second cylindrical portion, whose diameter is smaller than the first cylindrical portion, and is adapted to engage an outer jacket of the cable when crimped. A rigid sheath tube surrounds the buffered fiber within the cable so that it is not damaged during crimping, and is free to move back and forth within the cable.

17 Claims, 4 Drawing Sheets

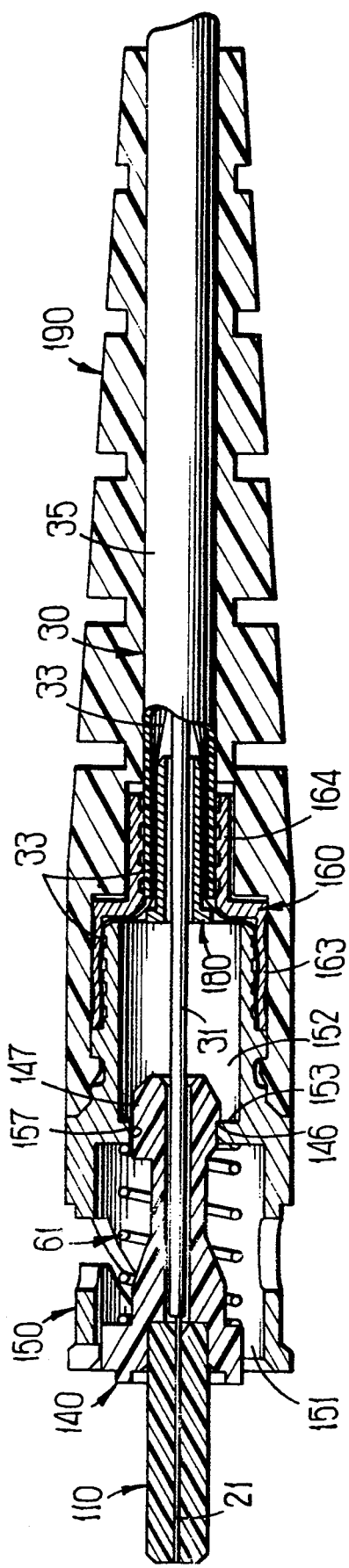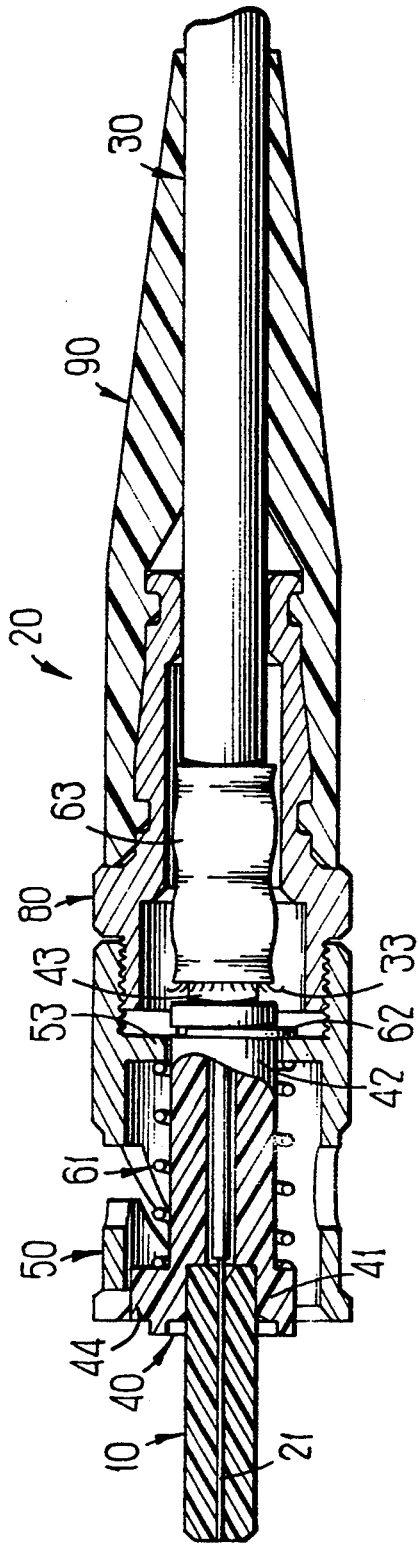

OPTICAL FIBER CONNECTOR HAVING A UNIPARTITE CAP

TECHNICAL FIELD

This invention relates generally to optical fiber connectors, and more particularly to a design having a reduced number of structural components.

BACKGROUND OF THE INVENTION

A frequently used optical fiber connector for terminating and connecting two optical fibers is one which is referred to as an ST® connector—ST being a registered trademark of AT&T. The design of an ST connector is disclosed in U.S. Pat. No. 4,934,785 and includes an assembly comprising a ferrule and a barrel for holding same. The ferrule (sometimes also referred to as a plug) has a narrow passageway through its center for receiving an end portion of an optical fiber whose protective coating has been removed. The barrel (sometimes also referred to as a base member) also includes a passageway for receiving the coated optical fiber, and it terminates in a cylindrical cavity which holds the ferrule. Interconnection with another optical fiber generally involves butting ferrules together in such a way that there is maximum coupling of the light rays between their included fibers. This is no easy task, particularly in single mode transmission where light rays are generally confined to a small region (mode field diameter) at the center of the fiber having a diameter which is less than ten microns. The ferrules, and hence the fibers themselves, are spring loaded so that they are urged together via a predetermined force. However, should the ferrules become slightly misaligned by the application of a non axial force, there will be a considerable forward loss in the amount of light coupled between fibers. Moreover, even an axial force applied to the cable will cause considerable forward loss in coupled light when it exceeds the compression force of the spring which urges the ferrules together. With an air gap, a significant increase also occurs in return loss, or reflectance, which is caused by a difference in refractive index created by any separation between optical fiber ends. The challenge, then, is to design a connector that eliminates, or at least minimizes, the effect of such forces.

An improvement on the above patent is shown in U.S. Pat. No. 4,812,009 which discloses an optical fiber con hector that includes an extender for transferring bending forces applied to its associated cable. Without the extender, these forces might cause the ferrule to move in such a way that optical disconnection occurs. During assembly of the connector, a ferrule/barrel assembly is captured between adjacent interior cavities of the cap using a C-shaped retainer which installs around the barrel after it is inserted through the free end of the cap. Thereafter, the extender is threaded onto the cable-insertion end of the cap. Unfortunately, threading the extender onto the cap is a process that can be performed incorrectly, and there are costs associated with each additional part and manual assembly.

Another problem associated with the above-described connector is its potential for optical disconnection. Recall that the ferrule/barrel assembly is biased outwardly of the cap by a compression spring, and that axial forces applied to the fiber optic cable are directly transferred to the ferrule/barrel assembly. Once the axial force exceeds the compression force of the spring (about 2 lbs.), there is optical disconnection.

U.S. Pat. No. 5,096,276 discloses a connector which attaches tensile strength members (aramid fibers) within the fiber optic cable to the connector housing rather than the ferrule/barrel assembly in order to protect against inadvertent optical disconnection. However, a relatively large number of precision parts are required. On the other hand, U.S. Pat. No. 5,142,601 discloses a connector that includes a single-piece holder which is split along its longitudinal axis so that a nylon-coated fiber can be installed by "after-attachment." Although the number of component parts is a reduction over known optical connecting devices, it is achieved with reduced functionality. For example, the ferrule and associated base member which holds it appear to be only loosely coupled to the holder via tension on the optical fiber itself. Such tension varies according to the skill of the manual assembler of the connector.

What is needed, and what is not supplied by the prior art, is an optical connector which protects against inadvertent disconnection caused by axial forces applied to the cable and which uses relatively few parts.

SUMMARY OF THE INVENTION

The foregoing problems are solved by an optical fiber connector which comprises a ferrule which is adapted to terminate an optical fiber and insert into a ferrule-receiving end of a barrel member, and a cap having a connector end and a cable-receiving end. The cap is of unipartite construction and is adapted to cooperate with a crimping sleeve to capture fibrous strength members from an optical fiber cable. The cap includes an interior region which comprises a pair of generally cylindrical, adjacent cavities that are separated by an opening whose diameter is smaller than the diameter of either cavity. The barrel member includes an enlarged portion at its other end which is slightly larger than the opening between the cavities such that during assembly to the unipartite cap, it is forced through and captured in the opening. A compression spring surrounds the barrel member and biases it toward the connector end of the cap.

In an illustrative embodiment of the invention, the connector end of the cap is adapted to join with an optical coupling device via a twist-and-lock, ST-type connection. Additionally, the enlarged portion of the barrel member includes a key which mates with an alignment slot in the opening between the cavities of the cap. The crimping sleeve has a generally cylindrical shape and comprises two sections—each having a different diameter. One of the sections is sized to be crimped to the cap while the other is sized to be crimped to an optical cable. A rigid sheath tube surrounds the buffered fiber within the optical cable so that it is not damaged during crimping, and is free to move back and forth within the cable.

BRIEF DESCRIPTION OF THE DRAWING

The invention and its mode of operation will be more clearly understood from the following detailed description when read with the appended drawing in which:

FIG. 3 is a side elevation view, in cross section, of the optical fiber connector;

FIG. 5 is a side elevation view, in cross section, of a prior art connector.

DETAILED DESCRIPTION

Figure 4:
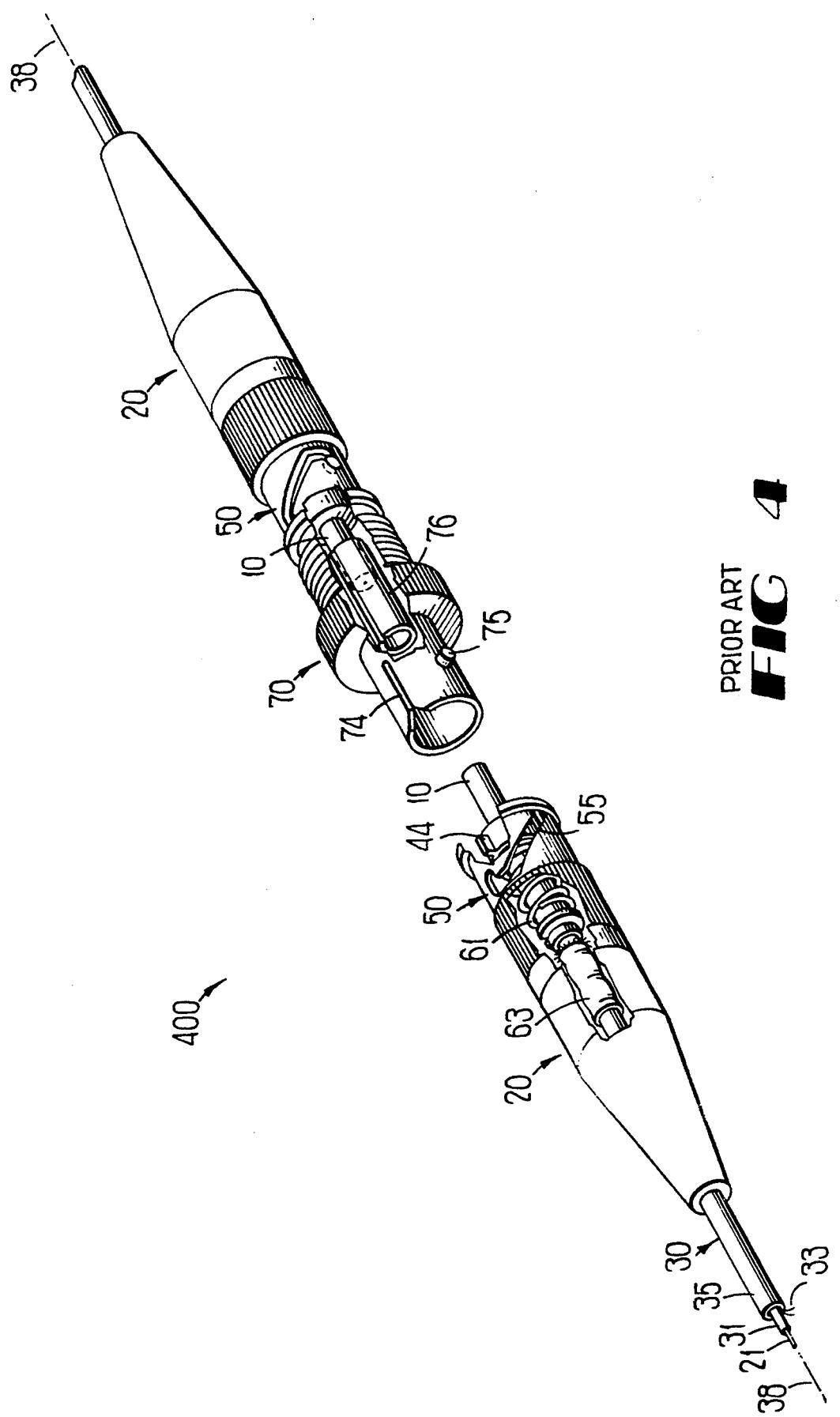
FIG. 4 is a perspective view of a pair of prior art ST connectors and a coupling apparatus for joining them together.

A perspective view of a known connector system, designated generally by the numeral 400, is shown in FIG. 4 comprising a pair of ST connectors 20 joined by a coupling apparatus 70. Corresponding elements of the connectors 20-20 are identified with the same numerals. The connectors are coaxially aligned along a longitudinal axis 38-38. Each connector includes a cylindrical ferrule 10 made, for example, from a glass, ceramic or plastic material and having a narrow passageway through its central axis for receiving an end portion of an optical fiber 21. Ferrule 10 has an outer diameter of about 2.5 millimeters. Each of two optical fibers 21-21 to be connected includes a glass core and cladding, enclosed in a coating system, which is well known in the art. The optical fiber is enclosed in a buffer 31 of polyvinyl chloride (PVC), for example, to provide what is referred to as buffered fiber. To withstand tensile forces that might otherwise fracture the buffered fiber, the cable is constructed with a loadbearing portion in the form of strength members 33 that surround the buffered fiber. Elongated slender polymeric fibers of high tensile strength, such as aramid yarn, are suitable for use in this regard. An outer jacket 35, also composed of PVC, surrounds the buffered fiber and strength members to complete the construction of optical fiber cable 30.

In terminating cable 30, the optical fiber coating system (as well as buffer 31, strength members 33 and outer jacket 35) is removed from an end portion of the optical fiber 21 prior to its termination in ferrule 10. Then the uncoated portion of the optical fiber is inserted into the narrow passageway of ferrule 10. The ferrule is urged toward the connector end of cap 50 by compression spring 61 so that a when a pair of ferrules are received, end-to-end, in a coupling sleeve 76, one or both of the ferrules is moved along its longitudinal axis 38-38 during the connection process. The ST connectors 20-20 shown in FIG. 4 may be connected,t to coupling apparatus 70 by so-called bayonet motion in which the connector is inserted with linear motion into the coupling apparatus and turned to cause projecting pins 75-75 of the coupling apparatus to be moved along camming slots 55-55 of the cap, and to cause a key 44 of the con hector to become disposed in a slot 74 of the coupling apparatus.

A cross section of prior art connector 20 is shown in FIG. 5 for the purpose of highlighting the advantages of the present invention as well as certain differences in construction therebetween. More detail regarding this prior art connector is contained in U.S. Pat. No. 4,812,009. In this drawing, a ferrule/barrel assembly is disclosed which includes means for preventing inadvertent angular movement of the ferrule 10 and for facilitating the turning of the cap 50 by applying a turning force at a location remote from the cap. A cap extender 80 having an external threaded portion is turned into the threaded entrance of the cap and secured thereto. The extender 80 is bonded to the cap 50 after it has been turned fully thereinto. The extender includes a boss which abuts the cap, and an internal disposed shoulder. Extender 80 includes a tubular portion which extends from its boss at one end to its cable-engaging portion at the other end. Completing the connector, there is shown a strain relief boot 90 which extends from the boss of the extender 80 along the optical fiber cable in a conical shaped configuration until it assumes the general dimension of the cable. The boot not only provides strain relief for the cable 30, but also insures that it can withstand repeated bends after interconnection with another cable without undue stress being imparted to the optical fiber. A small diameter portion 42 of the barrel 40 extends through an opening in an internally disposed lip 53 in the cap. A retaining clip 62 circumscribes this small diameter portion 42 of the barrel on the cable entrance side of the lip 53. A compression spring 61 is disposed about the small diameter portion 42 of the barrel between, and in engagement with, lip 53 and an enlarged end portion 41 of the barrel 40. As a result of this arrangement, the spring 61 biases the barrel 40 outwardly from the cap 50 while the retaining clip 62 holds the ferrule/barrel assembly within the cap 50. Barrel 40 includes a still smaller diameter portion 43 which is disposed at the cable receiving end thereof, and is intended to be sufficiently rigid so that when one end of sleeve 63 is crimped to it, the optical fiber running through the center of the cable 30 will not be damaged. Note that strength members 33 are held to the barrel by such crimping such that axial forces applied to cable 30 are directly transferred to barrel 40. Finally, sleeve 63 is gently crimped, at its other end, to the outer jacket 35 (see FIG. 4) of cable 30.

Certain disadvantages are associated with the above-described connector 20. In particular, extender 80 must be joined to cap 50 which requires manual assembly and can be done improperly. And since the cable 30 only attaches to the barrel, when it is pulled along a longitudinal axis with enough force to overcome the spring bias (about 2 pounds), the ferrule 10 breaks mechanical contact with an abutting ferrule and thereby increases the coupling loss. Further, attachment of the retaining clip 62 to the barrel 40 requires simultaneous compression of spring 61 which is a non-trivial process. It is with such concerns in mind that reference is now made to FIG. 1 which overcomes at least these disadvantages.

Figure 1:
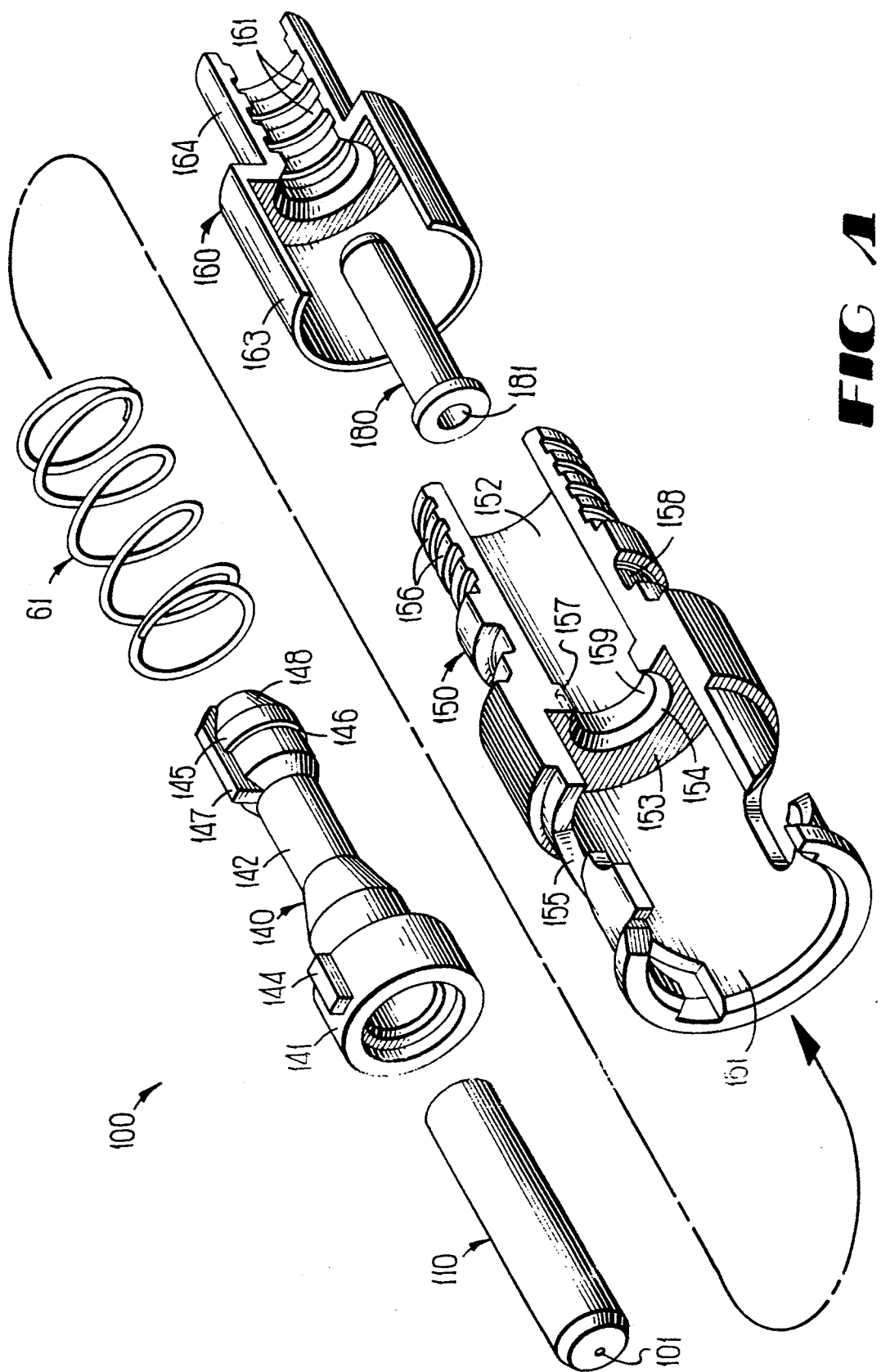
FIG. 1 is an exploded perspective view of an optical fiber connector in accordance with the present invention.

FIG. 1 is an exploded perspective view of an optical fiber connector 100 having a reduced number of component parts (as compared with known connectors) which is easy to assemble, and which delivers axial stress to the cap rather than to the ferrule/barrel assembly. Ferrule 110 comprises a ceramic or glass cylinder that is adapted to receive a glass fiber (not shown), whose protective coating has been removed, into an axially disposed opening 101 that extends between opposite ends thereof. The ferrule then fits into a cavity at one end of barrel 140 which is shaped to receive it. The barrel may be a machined or molded part, and may be made from metal or plastic material. In the preferred embodiment of the invention, barrel 140 is molded from PEI (Polyetherimide) material into a particularly advantageous shape. In particular, enlarged portion 141 is sized to cooperate with spring member 61, while enlarged portion 145 is sized to cooperate with internally disposed lip 153 of the cap 150. Furthermore front key 144 is shaped to cooperate with a slot 74 in a coupling apparatus 70 (see FIG. 4) while rear key 147 is shaped to cooperate with a slot 157 in internally disposed, annular lip 153 of the cap. These keys are positioned such that when the barrel 140 is installed into the cap 150, front key 144 will be positioned to guide the connector end of cap 150 into the correct mating relationship with a coupling apparatus such as shown in FIG. 4.

It is important that the enlarged portion 145 be somewhat larger than an opening 159 in the interior of cap 150 which is designed to capture barrel 140 therein, so that once the barrel is inserted it cannot be easily removed. In accordance with that end, lip 153 within the cap and enlarged portion 145 of the barrel are shaped appropriately. For example, a bevel 148 facilitates insertion of the enlarged portion 145 into opening 159 while shoulder 146 of the barrel is shaped to discourage its removal. Furthermore, lip 153 includes tapered portion 154 which cooperates with bevel 148 to encourage easy insertion of barrel 140 into cap 150. Once the barrel is inserted into the cap, the narrow diameter portion 142 of the barrel moves freely in a longitudinal direction without interference from lip 153.

After connector 100 is assembled, the spring member 61 operates in its compression mode by simultaneously pressing against that portion of lip 153 which faces cavity 151 of the cap, and against the enlarged portion 141 of the barrel. Accordingly, the ferrule/barrel assembly is urged toward the connector end of cap 150 by spring 61 which, illustratively, is made from stainless steel.

Advantageously, cap 150 is a single piece part (i.e., it is of unipartite construction) which incorporates interconnection features at its connector end, barrel-retaining features within its interior, and strength-member-retaining features at its cable-receiving end. These features cooperate to provide a low cost, easy-to-assemble, optical connector 100. At the connector end, for example, camming slot 155 is provided to enable interconnection with known ST connecting apparatus. Internal to cap 150, cylindrical cavities 151,152 are adjacent to each other and are separated by a generally cylindrical opening 159 whose diameter is smaller than the diameter of either cavity. The opening includes a slot 157 which accommodates rear key 147 of the barrel 140, but only allows it to be inserted in one particular orientation. As stated above, both the barrel and the cap include features which facilitate interconnection with a coupling apparatus. At the cable-receiving end of the cap 150, externally disposed circumferential ribs 156 are provided for the purpose of cooperating with a crimping sleeve 160 to capture the yarn-like strength members 33 that reside within cable 30 (see FIG. 4). The crimping sleeve itself includes internally disposed circumferential ribs 161 which are designed to grasp the outer jacket 35 of cable 30 (see FIG. 4). Crimping sleeve 160 is cylindrically shaped having a large-diameter portion 163 for interfacing with the cable-entrance end of cap 150, and a small-diameter portion 164 for interfacing with an optical cable. In order to protect the optical fiber itself from such crimping, a sheath tube 180 is provided, made from nickel-plated brass in the preferred embodiment, which receives a buffered optical fiber within an axial passageway 181 therethrough, and protects it against the crimping forces applied to small-diameter portion 164 of the crimping sleeve.

Figure 2:
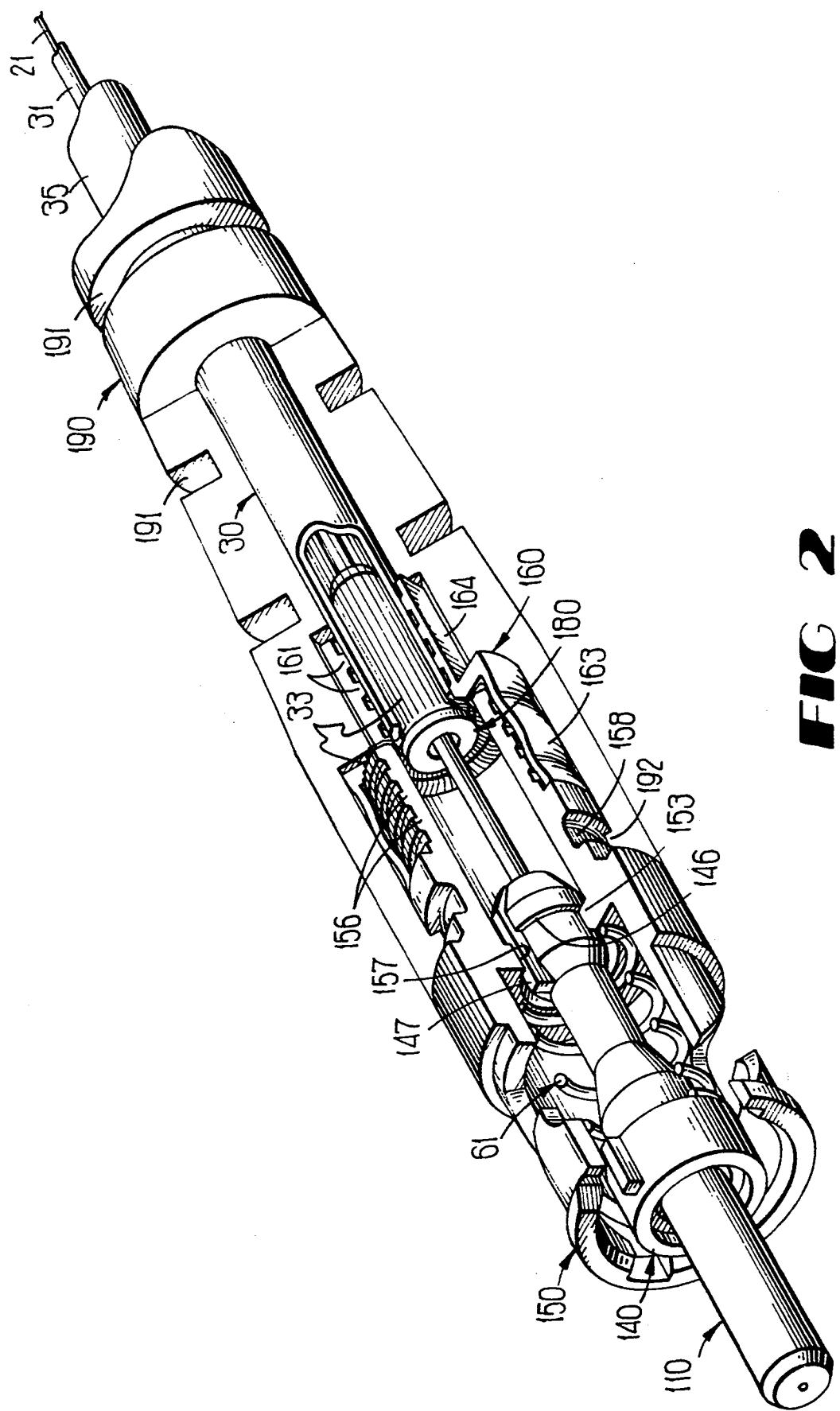
FIG. 2 is a perspective view of the assembled optical fiber connector with a section removed to reveal the details of its construction.

FIG. 2 is a perspective view of the assembled optical fiber connector with a section removed to reveal additional details regarding its construction. For example, a portion of the outer jacket 35 of the cable is removed to reveal strength members 33 which are captured between the large-diameter portion 163 of the crimping sleeve and externally-disposed, circumferential ribs 156 of the cap. Additionally, internally-disposed, circumferential ribs 161 tend to dig into the cable jacket 35 when the small-diameter portion 164 of the crimping sleeve is crimped, thereby clamping the cable and preventing relative movement between the cable and the crimping sleeve.

FIG. 2 also shows a compliant strain-relief boot. 190 which attaches to the cable-receiving end of the cap 150 and surrounds a portion of the cable. The boot includes grooves 191-191 which allow a predetermined amount of bending before offering significantly increased resistance to further bending. Accordingly, the bend radius of the optical fiber 21 within the cable is effectively limited. The strain-relief hood includes an internally-disposed, circumferential rib 192 which "snap-locks" into groove 158 of the cap 150 to lock the boot and cap together. A suitable material for the strain-relief boot is Santoprene ® elastomer—a somewhat rigid thermoplastic which is commercially available from Monsanto Chemical Company. Additionally, an adhesive such as epoxy may be used to bond strain-relief boot 190 to the cap 150 directly, thereby capturing the filamentary strength members 33 between them and eliminating the need for a crimping sleeve.

Referring now to FIG. 3, a side elevation view of the novel optical fiber connector is shown in cross section. In particular, the positioning of the rear key 147 is shown in its normal position within the included slot 157 of opening 159 between cavities 151,152 of the cap. Note also that the enlarged portion 145 of the barrel is larger than the opening so that it needs to be forcibly pressed through it. Whereas spring member 61 urges the ferrule/barrel assembly toward the connector end of the cap, shoulder 146 is used to withstand such urging and maintain the ferrule/barrel assembly firmly within the cap.

Although a particular embodiment of the present invention has been shown and described, it is understood that various modifications are possible within the spirit and scope of the invention. These modifications include, but are not limited to, the use of other materials in the construction of the connector and the use of the present invention in other than ST-type connectors.

We claim:

1. A connector for terminating an optical fiber cable and for making connection with a predetermined coupling apparatus, the connector including a ferrule/barrel assembly which comprises (i) a cylindrically shaped ferrule having a passageway through its longitudinal axis for receiving an optical fiber, (ii) a barrel member, also having a passageway through its longitudinal axis for receiving the optical fiber, comprising a ferrule-receiving end, a central portion, and a cap-engaging end which is enlarged with respect to the central portion, and (iii) a spring member disposed about the central portion of the barrel member a unipartite cap having a cable entrance end for receiving an optical fiber cable, and a connector end adapted to make mechanical connection with the predetermined coupling apparatus, the unipartite cap including an internally disposed pair of cavities that are adjacent to each other but separated by an annular lip which circumscribes an opening between said cavities whose cross-section area is slightly smaller than the cross section-area of the cap-engaging end of the barrel member; and a crimping sleeve having a first cylindrical portion which surrounds the cable-entrance end of the unipartite cap for capturing the strength member from the optical fiber cable therebetween.

2. The connector of claim 1 wherein the crimping sleeve further includes a second cylindrical portions, adjacent to said first cylindrical portion thereof, which includes internally disposed, circumferential ribs for engaging an outer jacket of the optical fiber cable when it is crimped.

3. The connector of claim 2 further including a rigid sheath member having a passageway through its longitudinal axis for receiving an optical fiber, said sheath member being adapted to cooperate with the second cylindrical portion of the crimping sleeve to enage an outer jacket portion of the optical fiber cable.

4. The connector of claim 2 wherein the first cylindrical portion of the crimping sleeve has a diameter which is larger than the diameter of the second portion thereof.

5. The connector of claim 1 wherein the connector end of the unipartite cap comprises an ST connector.

6. The connector of claim 1 wherein the spring member applies a compression force against said annular lip of the cap and against said ferrule-receiving end of the barrel member.

7. The connector of claim 1 wherein the cap-engaging end of the barrel member includes a bevel to facilitate insertion into the opening.

8. The connector of claim 1 wherein the cap-engaging end of the barrel member includes a first radially outward-projecting key and the annular lip of the unipartite cap includes a slot for receiving the key, whereby the key and slot cooperate to control the orientation between the barrel member and the cap.

9. The connector of claim 8 wherein the ferrule-receiving end of the barrel member includes a second radially outward-projecting key which is adapted to cooperate with a mating slot in the predetermined coupling apparatus.

10. The connector of claim 9 wherein the first and second radially outward-projecting keys are in a fixed relative position with respect to each other; whereby, once the first key is entered into the slot within the annular lip, the second key is automatically positioned with respect to connector end of the cap.

11. The connector of claim 1 wherein the annular lip within the unipartite cap includes a tapered portion which facilitates insertion of the cap-engaging end of the barrel into the opening.

12. The connector of claim 1 wherein the annular lip and the opening defined thereby are substantially cylindrical.

13. An optical fiber connector for connecting an optical fiber of an optical fiber cable to optical means, said connector comprising:

a plug assembly which includes a ferrule for terminating an optical fiber and a base member for supporting one end of the ferrule, said ferrule and said base member being coaxially aligned along their longitudinal axis and having a passageway along said axis for receiving the optical fiber, the base member comprising a ferrule-receiving end, a central portion, and a cap-engaging end which is enlarged with respect to the central portion;

a cap of single-piece construction having a cable-receiving end, and a connector end for receiving the plug assembly, the cap including an internally disposed pair of cavities that are adjacent to each other but separated by an opening between said cavities whose cross-section area is smaller than either the cross-section area of the cap-engaging end of the base member or the cross-section area of said cavities;

resilient means disposed around the base member for urging said plug assembly outwardly from said connector end of the cap; and a crimping sleeve for receiving said cap in one end thereof and the optical fiber cable in its other end, said crimping sleeve and said cap being adapted to capture and hold filamentary strength members from said cable.

14. In combination, an optical fiber cable and a connector for same, the optical fiber cable comprising:

a buffered optical fiber surrounded by a plurality of non-metallic filamentary strength members, said strength members extending in the same longitudinal direction as the optical fiber and being enclosed within a dielectric outer jacket;

the connector comprising:

a plug assembly which includes a ferrule for terminating an optical fiber and a base member for supporting one end of the ferrule, said ferrule and said base member being coaxially aligned along their longitudinal axis and having a passageway along said axis for receiving the optical fiber, the base member comprising a ferrule-receiving end, a central portion, and a cap-engaging end which is enlarged with respect to the central portion;

a cap of single-piece construction having a cable-receiving end, and a connector end that is adapted to receive the plug assembly, the cap including an internally disposed pair of cavities that are adjacent to each other but separated by an opening between said cavities whose cross-section area is smaller than either the cross-section area of the cap-engaging end of the base member or the cross-section area of said cavities;

resilient means disposed around the base member for urging said plug assembly outwardly from said connector end of the cap; and a crimping sleeve attached to the cable-receiving end of the cap and capturing the non-metallic filamentary strength members therebetween; whereby forces applied to cable in the longitudinal direction are transferred to the cap.

15. The combination of claim 14 further comprising a compliant boot attached to the cable-receiving end of the cap and to the cable, said boot being adapted to limit the radius associated with bends in the cable caused by forces applied to the cable in a direction which is normal to the longitudinal axis.

16. The combination of claim 14 wherein the filamentary strength members comprise aramid yarn.

17. A connector for terminating an optical fiber cable and for making connection with a predetermined coupling apparatus, the connector including a ferrule/barrel assembly which comprises (i) a cylindrically shaped ferrule having a passageway through its longitudinal axis for receiving an optical fiber, (ii) a barrel member, also having a passageway through its longitudinal axis for receiving the optical fiber, comprising a ferrule-receiving end, a central portion, and a cap-engaging end which is enlarged with respect to the central portion, and (iii) a spring member disposed about the central portion of the barrel member

CHARACTERIZED BY:

a unipartite cap having a cable entrance end for receiving an optical fiber cable, and a connector end adapted to make mechanical connection with the predetermined coupling apparatus, the unipartite cap including an internally disposed pair of cavities that are adjacent to each other but separated by an annular lip which circumscribes an opening between said cavities whose cross-section area is slightly smaller than the cross section-area of the cap-engaging end of the barrel member; and a compliant strain-relief boot which surrounds the cable-entrance end of the unipartite cap for capturing the strength member from the optical fiber cable therebetween.

* * * * *